United States Patent
Schenk et al.

(10) Patent No.: US 10,656,273 B2
(45) Date of Patent: May 19, 2020

(54) METHOD FOR OPERATING ON OPTOELECTRONIC SENSOR OF A MOTOR VEHICLE HAVING VARIABLE ACTIVATION OF A LIGHT SOURCE, OPTOELECTRONIC SENSOR, DRIVER ASSISTANCE SYSTEM, AND MOTOR VEHICLE

(71) Applicant: Valeo Schalter und Sensoren GmbH, Bietigheim-Bissingen (DE)

(72) Inventors: Jochen Schenk, Bietigheim-Bissingen (DE); Frank Selbmann, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 0 days.

(21) Appl. No.: 16/461,972

(22) PCT Filed: Nov. 13, 2017

(86) PCT No.: PCT/EP2017/078976
§ 371 (c)(1),
(2) Date: May 17, 2019

(87) PCT Pub. No.: WO2018/091384
PCT Pub. Date: May 24, 2018

(65) Prior Publication Data
US 2019/0324146 A1    Oct. 24, 2019

(30) Foreign Application Priority Data
Nov. 18, 2016  (DE) .................... 10 2016 122 194

(51) Int. Cl.
*G01S 17/42* (2006.01)
*G01S 7/481* (2006.01)
(Continued)

(52) U.S. Cl.
CPC ............ *G01S 17/42* (2013.01); *G01S 7/4817* (2013.01); *G01S 17/931* (2020.01); *G01S 7/484* (2013.01); *G01S 7/486* (2013.01)

(58) Field of Classification Search
CPC ...... G01S 7/4817; G01S 7/484; G01S 17/026; G01S 7/4868; G01S 17/10; G01S 17/42;
(Continued)

(56) References Cited

U.S. PATENT DOCUMENTS

2011/0255070 A1* 10/2011 Phillips ................. G01S 7/4813
356/4.01
2012/0323474 A1* 12/2012 Breed ................... B60W 30/04
701/117
(Continued)

FOREIGN PATENT DOCUMENTS

DE   10 2012 020288 A1   4/2014
DE   10 2013 219567 A1   4/2015

OTHER PUBLICATIONS

International Search Report and Written Opinion in corresponding International Application No. PCT/EP2017/078976, dated Feb. 6, 2018 (11 pages).
(Continued)

*Primary Examiner* — Michael P Stafira
(74) *Attorney, Agent, or Firm* — Osha Liang LLP (57) ABSTRACT

The invention relates to a method for operating an optoelectronic sensor (5) of a motor vehicle (1), in which during a measuring cycle for detecting an object (3), light pulses are emitted using an emitting unit (6) and the light pulses reflected from the object (3) are received using a receiving unit (7), wherein a light source (12) of the emitting unit (6) is activated at determined emission points in time (14) to emit the light pulses and the light pulses are deflected using a deflection unit (13) of the emitting unit (6) within a predetermined angle range (12), wherein the light source
(Continued)

(12) is activated in such a way that time intervals between the determined emission points in time (14) differ from one another.

10 Claims, 6 Drawing Sheets

(51) Int. Cl.
    *G01S 17/931*     (2020.01)
    *G01S 7/484*     (2006.01)
    *G01S 7/486*     (2020.01)

(58) Field of Classification Search
CPC ...... G01S 17/89; G01S 17/936; G01S 7/4814; G01S 7/4861; G01S 7/4863; G01S 7/497; G01S 17/93; G01S 7/4808; G01S 7/4815; G01S 7/486; G01S 7/4876; G01S 7/4972; G01S 13/18; G01S 13/22; G01S 17/933; G01S 7/414; G01S 7/4818; G01S 7/487; G01S 17/023; G02B 26/0816; G02B 26/0858; G02B 26/10; G02B 26/101; G02B 26/12
See application file for complete search history.

(56) References Cited

U.S. PATENT DOCUMENTS

| | | |
|---|---|---|
| 2016/0274589 A1 | 9/2016 | Templeton et al. |
| 2017/0090032 A1* | 3/2017 | Ridderbusch ........... G01S 17/10 |
| 2019/0271769 A1* | 9/2019 | Raly ..................... G01S 7/4817 |

OTHER PUBLICATIONS

German Search Report in corresponding German Application No. 10 2016 122 194.5, dated Jul. 20, 2017 (7 pages).

* cited by examiner

METHOD FOR OPERATING ON OPTOELECTRONIC SENSOR OF A MOTOR VEHICLE HAVING VARIABLE ACTIVATION OF A LIGHT SOURCE, OPTOELECTRONIC SENSOR, DRIVER ASSISTANCE SYSTEM, AND MOTOR VEHICLE

The present invention relates to a method for operating an optoelectronic sensor of a motor vehicle, in which during a measuring cycle for detecting an object, light pulses are emitted using an emitting unit and the light pulses reflected from the object are received using a receiving unit, wherein a light source of the emitting unit is activated at specific emitting points in time to emit the light pulses and the light pulses are deflected within a predetermined angle range using a deflection unit of the emitting unit. In addition, the present invention relates to an optoelectronic sensor. Furthermore, the present invention relates to a driver assistance system. Finally, the present invention relates to a motor vehicle.

Interest is directed in the present case in particular to optoelectronic sensors for motor vehicles. Such optoelectronic sensors can be designed, for example, as lidar sensors (lidar—light detection and ranging) or as laser scanners. Such optoelectronic sensors are installed, for example, in motor vehicles to detect the surroundings of the motor vehicle during travel and/or in operation of the motor vehicle. The optoelectronic sensor is in this case in particular a scanning optical measuring device, by means of which objects and/or obstacles in the surroundings of the motor vehicle can be detected. For example, a distance between the motor vehicle and the object can be determined on the basis of the time of flight of a light pulse and/or according to the so-called time-of-flight principle using the optoelectronic sensor. The optoelectronic sensor typically comprises an emitting unit, which has a laser diode, for example, by means of which an optical emitted signal in the form of a light pulse can be emitted. In addition, the optoelectronic sensor comprises a corresponding receiving unit, which has at least one photodiode, for example, by means of which the light pulse reflected from the object can be received as a received signal.

The light pulses are emitted in a predetermined angle range using the optoelectronic sensor. To deflect the light pulses or the laser light within the angle range, the emitting unit has a deflection unit, which can comprise a mirror, for example. This mirror can move periodically, for example. The light pulses can be emitted at predetermined emitting points in time. A predetermined horizontal angle range in the surroundings of the motor vehicle can thus be scanned using the emitting unit. The angle resolution within the predetermined angle range can then be determined by the activation of the emitting unit or a light source of the emitting unit. It is typically provided in this case that the light source is periodically activated. A higher measurement density results in the peripheral regions of the mirror deflection in this way, since the angular velocity of the mirror is lower there than during the deflection around an initial position.

It is the object of the present invention to disclose a solution for how a measurement using an optoelectronic sensor of the type mentioned at the outset can be carried out more efficiently and reliably.

This object is achieved according to the invention by a method, by an optoelectronic sensor, by a driver assistance system, and by a motor vehicle having the features according to the respective independent claims. Advantageous embodiments of the invention are the subject matter of the dependent claims.

In one embodiment of a method for operating an optoelectronic sensor of a motor vehicle, light pulses are preferably emitted using an emitting unit during a measuring cycle to detect an object. Furthermore, the light pulses reflected from the object are preferably received using a receiving unit. To emit the light pulses, a light source of the emitting unit is preferably activated at specific emitting points in time and the light pulses are in particular deflected using a deflection unit of the emitting unit within a predetermined angle range. In this case, the light source is preferably activated in such a way that time intervals between the determined emitting points in time differ from one another.

A method according to the invention is used for operating an optoelectronic sensor of a motor vehicle. For this purpose, light pulses are emitted using an emitting unit during a measuring cycle to detect an object and the light pulses reflected from the object are received using a receiving unit. To emit the light pulses, a light source of the emitting unit is activated at specific emitting points in time and the light pulses are deflected using a deflection unit of the emitting unit within a predetermined angle range. In this case, the light source is activated in such a way that time intervals between the determined emitting points in time differ from one another.

The optoelectronic sensor can be installed in a motor vehicle, in particular in a passenger vehicle. The optoelectronic sensor can be designed in particular as a lidar sensor or as a laser scanner. Objects in the surroundings of the motor vehicle can be detected using the optoelectronic sensor. In particular, a distance between the motor vehicle and the object can be determined on the basis of the measurements of the optical sensor. Chronologically successive measuring cycles are carried out using the optoelectronic sensor to detect the object. In each measuring cycle, a specific number of emitted signals in the form of light pulses are emitted using the emitting unit. In this case, the light pulses are emitted within the predetermined angle range, in particular within a predetermined horizontal angle range. The emitted light pulses which are reflected from the object can then be received using the receiving unit of the optoelectronic sensor.

The emitting unit has the light source, which can comprise a laser diode, for example. The light pulses or the laser pulses are then emitted using this light source. A light pulse is to be understood in the present case to mean that the light source is activated at specific emitting points in time for a predetermined chronological duration and subsequently deactivated again. For this purpose, the light source can be activated using a processing unit of the optoelectronic sensor. The light source is thus operated in a pulsed manner. The light pulses emitted by the light source are deflected by a deflection unit of the emitting unit. The deflection unit can comprise, for example, a mirror or a mirror element which moves periodically. The light pulses can thus be deflected along the predetermined angle range. Therefore, the emitted signals in the form of the light pulses can be emitted within the predetermined angle range at discrete angle positions, which are in particular uniformly distributed in the angle range.

According to one essential aspect of the present invention, it is provided that the light source is activated in such a way that the time intervals between the determined emitting points in time differ from one another. In other words, the light source is dynamically activated. In particular, it is provided that the light source is not periodically activated. This means that the time intervals between the emitting points in time at which the light source is activated differ from one another. In particular, it is provided that at least some time intervals between the emitting points in time differ from one another. This enables, for example, the light pulses to be activated in dependence on the movement of the deflection unit or a mirror element of the deflection unit. In this manner it can be taken into consideration that the mirror element of the deflection unit has a lower angular velocity, for example, at a reversal point of the deflection and thus with a periodic activation of the light source, a higher measurement density is achieved in the peripheral regions. If the activation of the light source is adapted to the periodic movement of the deflection unit, the measuring cycle can then be carried out more efficiently and possibly within a shorter chronological duration. Moreover, it is possible to prevent individual regions in the angle range which are to be scanned from being excessively illuminated, and thus living beings being endangered. The optoelectronic sensor can thus be operated more reliably.

The deflection unit preferably has a mirror element, which is periodically deflected to deflect the light pulses. In principle, the deflection unit can have a mirror element which is rotated, for example. However, it is preferably provided that the deflection unit has a mirror element which is formed essentially plate-shaped. This mirror element can then be pivoted about a pivot axis. The deflection unit can furthermore have a corresponding actuator, using which the mirror element can be moved or pivoted. The actuator can comprise a piezoelectric element, for example. Furthermore, it is provided in particular that the deflection unit is designed as a microsystem or as a MEMS (MEMS—micro-electromechanical system). In this manner, a deflection unit can be provided which is designed to save installation space in particular. Furthermore, the deflection unit can be operated at comparatively high frequencies. For example, frequencies in the range of multiple kilohertz can be achieved. In addition, the advantage results that the mirror element oscillates in nearly cosine form. In this case, the light pulses are emitted onto a region of the mirror element which is associated with the pivot axis. Due to the movement of the mirror element, a lower angular velocity results in the region of the maximum deflection and/or the minimum deflection than during a deflection around the 0° point. These different angular velocities can be compensated for by the variable activation of the light source.

A deflection angle of the mirror element is preferably determined and the light source is activated in dependence on the determined deflection angle. The position or the deflection of the mirror element can be determined in an ongoing manner during the movement of the mirror element. The light source can thus be activated in dependence on the present deflection of the mirror element. For example, an activation signal, using which the actuator is activated, which in turn moves the mirror element, can be used to determine the deflection angle of the mirror element. To determine the deflection angle of the mirror element, a position signal can also be output using the deflection unit, which describes the position or the deflection of the mirror element. For example, a signal can be output when the mirror element is located in the maximum or the minimum deflection. Since the mirror element is moved periodically, the present deflection of the mirror element can be reliably determined at every point in time.

According to a further embodiment, a plurality of angle positions for the emission of the light pulses is determined within the angle range, an emission deflection angle is determined for each of the angle positions, and the respective light pulse is emitted if the deflection angle of the mirror element corresponds to one of the determined emission deflection angles. As already explained, the light pulses are to be emitted within the predetermined horizontal angle range at discrete angle positions, which are in particular distributed uniformly in the angle range. Each of these discrete angle positions in the angle range is associated with an emission deflection angle of the mirror element. The emission deflection angle describes a deflection angle of the mirror element at which a light pulse is to be emitted. If the mirror element reaches one of these emission deflection angles, the light source can be activated to emit the light pulse. For this purpose, a time can be taken into consideration which passes between the activation of the light source and the incidence of the light pulse on the mirror element. The light pulses can thus be emitted at the discrete angle positions in a reliable manner.

Furthermore, it is advantageous if an emission deflection angle closest to the present deflection angle is determined on the basis of the present deflection angle of the mirror element and the light pulse is emitted upon reaching the closest emission deflection angle. During the measuring cycle, the deflection or the deflection angle of the mirror element is determined in an ongoing manner. As already explained, the deflection unit can be activated so that the mirror element carries out a periodic movement. Therefore, the activation points in time at which the deflection unit is activated and a period duration of the periodic movement of the mirror element are known. The present deflection angle of the mirror element can then be computed therefrom. Furthermore, it is checked which of the emission deflection angles is closest to the present deflection angle. If this closest emission deflection angle of the mirror element is reached, the light pulse is emitted. It is thus made possible for the respective light pulses to be emitted at the emission deflection angles within a short time. In this manner, the chronological duration of the measuring cycle, during which the discrete angle positions are scanned in the angle range, can be shortened.

It is provided in particular in this case that a waiting time is determined on the basis of the present deflection angle and the closest emission deflection angle, after the passage of which the mirror element will reach the closest emission deflection angle, and the light pulse is emitted after the passage of the waiting time. The closest emission deflection angle can be determined on the basis of the present deflection of the mirror element, upon reaching which the light pulse is to be emitted. Since the mirror element is moved periodically and/or since the movement of the mirror element is known, the waiting time after which the mirror element will reach the closest emission deflection angle can be determined. The activation of the light source can thus be performed in a simple and reliable manner.

Furthermore, it is advantageous if the respective light pulses are only emitted once at each of the emission deflection angles during the measuring cycle. At each of the emission deflection angles of the mirror element which are associated with the discrete angle positions within the horizontal angle range, a light pulse is thus only emitted once in each case. It is thus possible to prevent, for example, a higher measuring density from resulting in the peripheral region of the deflection, which does not supply any additional information about the angle range to be scanned, however. Furthermore, the measuring cycle can be carried out more rapidly. Furthermore, the safety in operation of the optoelectronic sensor can be enhanced.

In a further embodiment, the first value is associated with each of the emission deflection angles at the beginning of the measuring cycle and if a light pulse is emitted at one of the emission deflection angles, a second value is associated with this emission deflection angle. For example, an array can be specified in which the respective emission deflection angles are entered. A Boolean value or an integer value can be stored as the first and as the second value for each of the emission deflection angles. For example, the first value can be zero or "false". If a light pulse is emitted at one of the emission deflection angles, the value which is associated with this position can be changed and/or the second value can be associated with the emission deflection angle. In this case, it can be provided, for example, that the second value is one or "true". It can thus be reconstructed in a simple manner at which emission deflection angles the light pulse has already been emitted. Furthermore, it can be checked in a reliable manner whether the light pulse was emitted at all emission deflection angles and therefore all discrete angle position within the angle range were scanned.

Furthermore, it is advantageous if an emission point in time is determined for each of the emission deflection angles and the light sources are activated at the determined emission points in time. For example, the emission deflection angles of the mirror element can be determined at the beginning of the measuring cycle for each of the discrete angle positions. Since the periodic movement of the mirror element is known, the associated emission points in time can then be determined for all emission deflection angles. Subsequently thereto, the light source can be activated at the determined emission points in time. A fixed interval sequence can thus be defined for the activation of the light source. The emission points in time can be defined in this case, for example, with respect to a predetermined position, for example, the zero position or a maximum deflection of the mirror element. If this position has been reached, the light source can then be activated at the determined emission points in time.

Furthermore, it is advantageous if the activation of the light source is synchronized with the movement of the mirror element. For example, the synchronization can take place at the beginning of the measuring cycle. It can also be provided that the synchronization is carried out during the startup of the optoelectronic sensor. The synchronization can also be carried out if the mirror element has reached a predetermined position, for example, a maximum or a minimum deflection. The synchronization can also be implemented with the aid of a square-wave signal, in which a positive or a negative flank is generated in the maximum or minimum deflection angle, respectively, of the mirror element. This enables reliable operation of the optoelectronic sensor.

In a further embodiment, a distance between the optoelectronic sensor and the object is determined after the emission of the light pulse on the basis of the time of flight between the emission of the light pulse and the reception of the light pulse reflected from the object and the next light pulse is subsequently emitted. In other words, after each emission of a light pulse, a time-of-flight measurement is carried out to determine the distance to the object. It is taken into consideration in this case that the chronological duration between the emission of the light pulse and the reception of the reflected light pulse is less than the time interval between the successive emission points in time. This overall enables the measuring cycle to be able to be carried out more rapidly.

An optoelectronic sensor according to the invention for a motor vehicle is designed to carry out a method according to the invention. The optoelectronic sensor can be designed in particular as a lidar sensor or as a laser scanner. The optoelectronic sensor can have the emitting unit for emitting the light pulses and the receiving unit for receiving the reflected light pulses. In addition, the optoelectronic sensor can have a deflection unit, for example, a micromirror, using which light pulses can be deflected. Furthermore, the emitting unit of the optoelectronic sensor can comprise the light source, in particular a laser diode. Moreover, the optoelectronic sensor can have a corresponding processing unit, by means of which the emission of the light pulses can be controlled. Furthermore, the distance to the object can be determined using the processing unit on the basis of the time of flight.

A driver assistance system according to the invention comprises an optoelectronic sensor according to the invention. For example, a distance to an object or an obstacle in the surroundings of the motor vehicle can be determined using the optoelectronic sensor. A notification to the driver can then be output using the driver assistance system on the basis of the distance or an intervention can be made in the longitudinal control and/or the lateral control of the motor vehicle.

A motor vehicle according to the invention comprises a driver assistance system according to the invention. The motor vehicle is designed in particular as a passenger vehicle. The motor vehicle can also be designed as a lorry or as a utility vehicle.

The preferred embodiments presented with reference to the method according to the invention and the advantages thereof apply accordingly to the optoelectronic sensor according to the invention, the driver assistance system according to the invention, and the motor vehicle according to the invention.

Further features of the invention result from the claims, the figures, and the description of the figures. The features and feature combinations mentioned above in the description, and the features and feature combinations mentioned hereafter in the description of the figures and/or solely shown in the figures are usable not only in the respective specified combination but rather also in other combinations or alone without leaving the scope of the invention. Therefore, embodiments are also to be considered to be comprised and disclosed by the invention which are not explicitly shown and explained in the figures but originate and can be created from the explained embodiments by separate feature combinations. Embodiments and feature combinations are also to be considered to be disclosed which do not have all features of an originally formulated independent claim. In addition, embodiments and feature combinations are to be considered to be disclosed, in particular by the above-described embodiments, which go beyond or deviate from the feature combinations represented in the references of the claims.

The invention will be explained in greater detail on the basis of preferred exemplary embodiments and with reference to the appended drawings.

In the figures.

In the figures, identical and functionally-identical elements are provided with identical reference signs.

Figure 1:
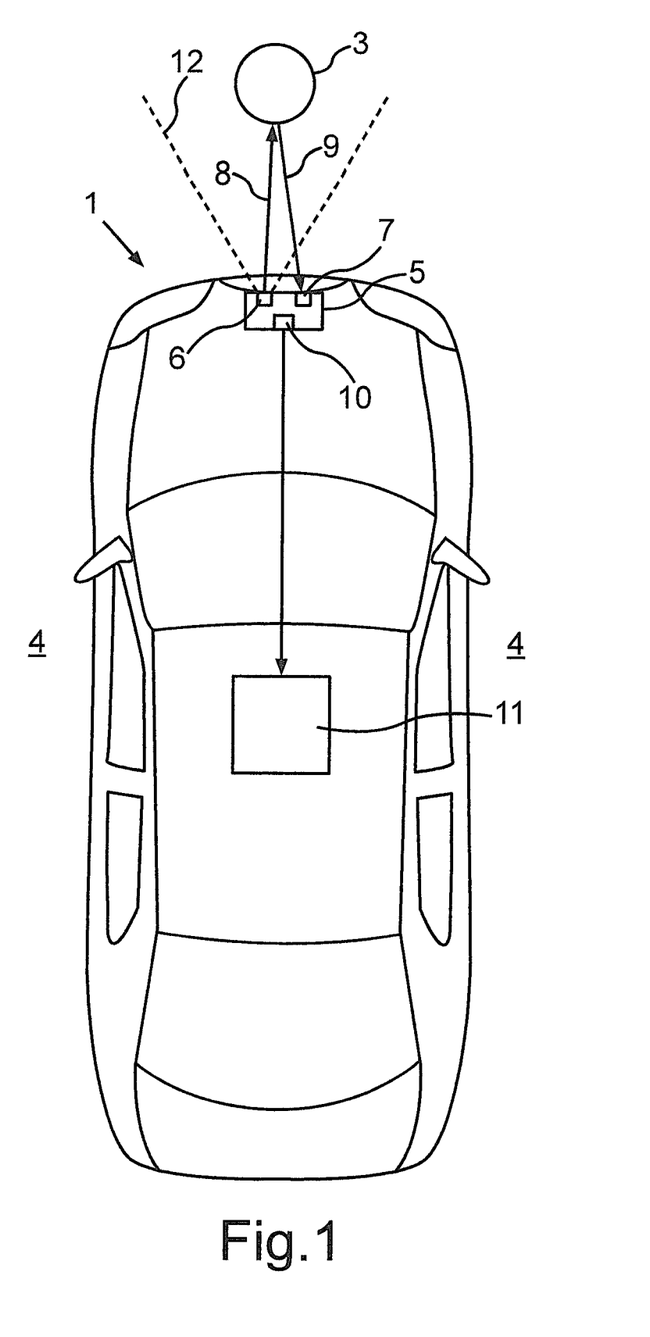
FIG. 1 shows a motor vehicle according to one embodiment of the present invention, which has a driver assistance system having an optoelectronic sensor.

FIG. 1 shows a motor vehicle 1 according to one embodiment of the present invention in a top view. The motor vehicle 1 is designed in the present case as a passenger vehicle. The motor vehicle 1 comprises a driver assistance system 2, which is used to assist a driver of the motor vehicle 1 when driving the motor vehicle 1. An object 3 which is located in the surroundings 4 of the motor vehicle 1 can be detected, for example, using the driver assistance system 2. If the object 3 is detected, a warning can be output to the driver using the driver assistance system 2. Furthermore, the driver assistance system 2 can engage in the steering, the braking system, and/or the drive motor to avoid a collision with the object 3.

To detect the object 3, the driver assistance system 2 comprises an optoelectronic sensor 5. The optoelectronic sensor 5 can be designed as a lidar sensor. The optoelectronic sensor 5 is preferably designed as a laser scanner. The optoelectronic sensor 5 comprises an emitting unit 6, by means of which light pulses can be emitted as the emission signal. This is illustrated in the present case by the arrow 8. The light pulses can be emitted in a predetermined angle range 12 using the emitting unit 6. For example, the light pulses can be emitted in a predetermined horizontal angle range. The optoelectronic sensor 5 furthermore comprises a receiving unit 7, by means of which the light pulses reflected from the object 3 can be received again. This is illustrated in the present case by the arrow 9.

In addition, the optoelectronic sensor 5 comprises a processing unit 10, which can be formed, for example, by a microcontroller, a digital signal processor, or an FPGA. The emitting unit 6 can be activated to emit the light pulses using the processing unit 10. In addition, the processing unit 10 can analyze signals of the receiving unit 7, which are generated using the receiving unit 7 on the basis of the received light pulses. Finally, the driver assistance system 2 comprises an electronic control unit 11, using which corresponding control signals can be output in dependence on the object 3 detected using the optoelectronic sensor 5.

Figure 2:
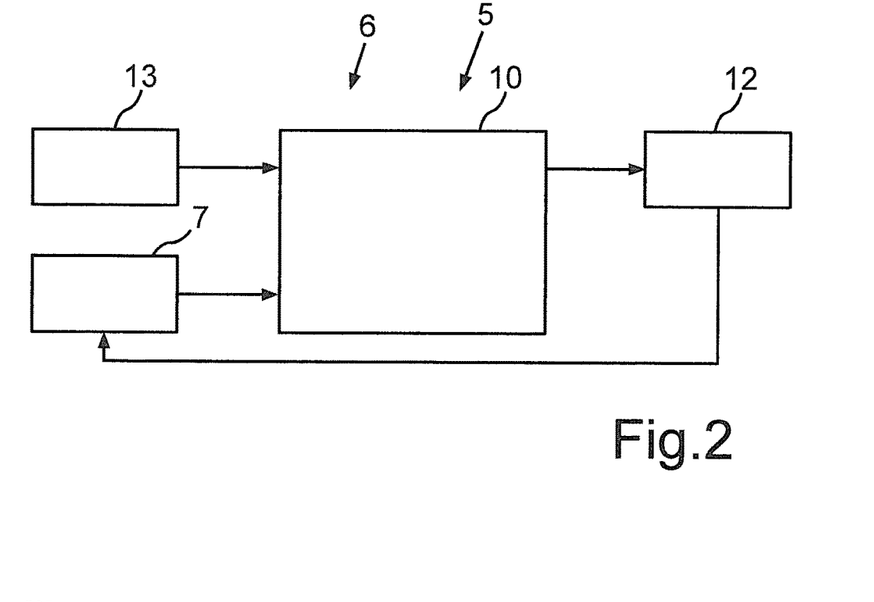
FIG. 2 shows a schematic illustration of the optoelectronic sensor.

FIG. 2 shows a schematic illustration of the optoelectronic sensor 5. It can be seen here that the emitting unit 6 has a light source 12. The light source 12 can be formed, for example, by a laser diode. In addition, the emitting unit 6 has a deflection unit 13, by means of which the light pulses emitted using the light source 12 can be deflected. The deflection unit 13 can comprise a mirror element, which is moved using an actuator. In particular, the deflection unit 13 is designed as a microsystem and/or comprises a micromirror. In this case, the mirror element can be activated using the actuator in such a way that it carries out a periodic movement at a frequency of multiple kilohertz, in particular 3.5 kHz. The light source 12 can be activated to emit the light pulses with the aid of the processing unit 10. For this purpose, a control signal can be transmitted to the light source 12 using the processing unit 10, by which the light source 12 is activated for a predetermined chronological duration.

Using the light source 12, a signal is furthermore transmitted to the receiving unit 7, which describes the emission point in time of the emission of the light pulse. When the light pulse reflected from the object 3 is received using the receiving unit 7, a corresponding signal can be transmitted to the processing unit 10, which describes the reception point in time of the light pulse. The processing unit 10 can thus determine the distance between the optoelectronic sensor 5 and the object 3 on the basis of the time of flight between the emission of the light pulse and the reception of the light pulse reflected from the object 3. In addition, a signal can be transmitted to the processing unit 10 using the deflection unit 13, which describes the present position of the mirror element and/or a present deflection angle α of the mirror element.

Figure 3:
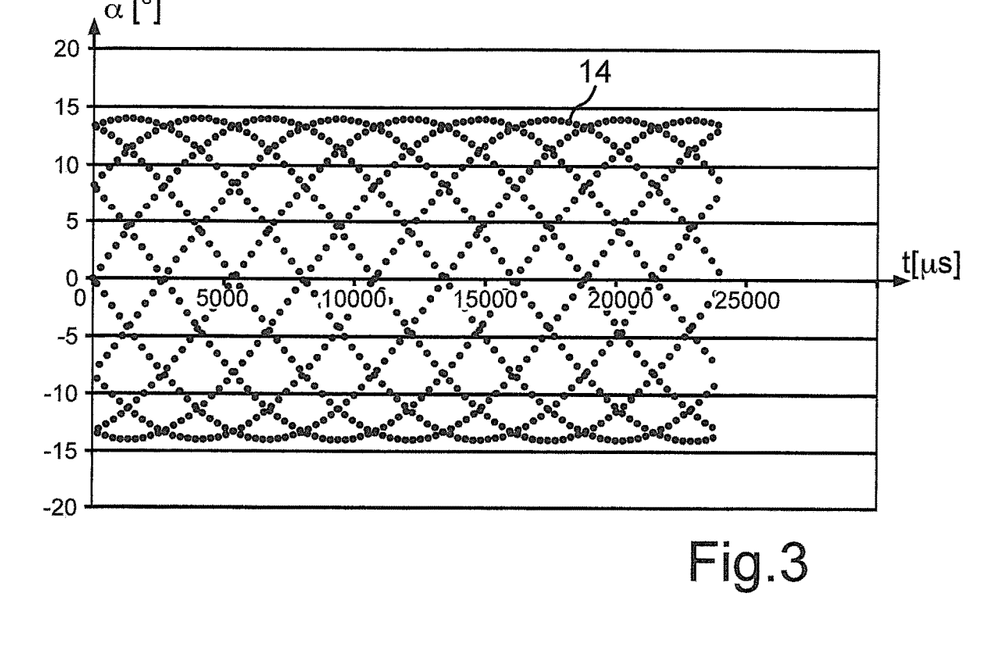
FIG. 3 shows a chronological sequence of emission points in time at which light pulses are emitted using an emitting unit of the optoelectronic sensor.

In optoelectronic sensors 5 known from the prior art, the light source 12 is periodically activated. The mirror element of the deflection unit 13 also moves periodically. Because the mirror element has a lower angular velocity during its movement in the peripheral regions and/or at the reversal points, a higher density of measurement points results at the peripheral regions. In this regard, FIG. 3 shows a diagram which shows the chronological sequence of emission points in time 14, at which the light pulses are emitted using the light source 12. In this case, the time t is plotted on the abscissa and the deflection angle α of the mirror element is plotted on the ordinate. In the present case, the mirror element oscillates between a deflection angle α of −14° and a deflection angle α of +14°. The mirror element can oscillate at a frequency of 3.5 kHz. An angle resolution of 0.1° is to be achieved within the predetermined angle range 12, which is to be scanned in the surroundings 4 of the motor vehicle 1. For this purpose, the light source 12 is activated at a frequency of 34 kHz. In the present case, a duration of approximately 24 ms is required to measure all discrete angle positions in the angle range 12.

Figure 4:
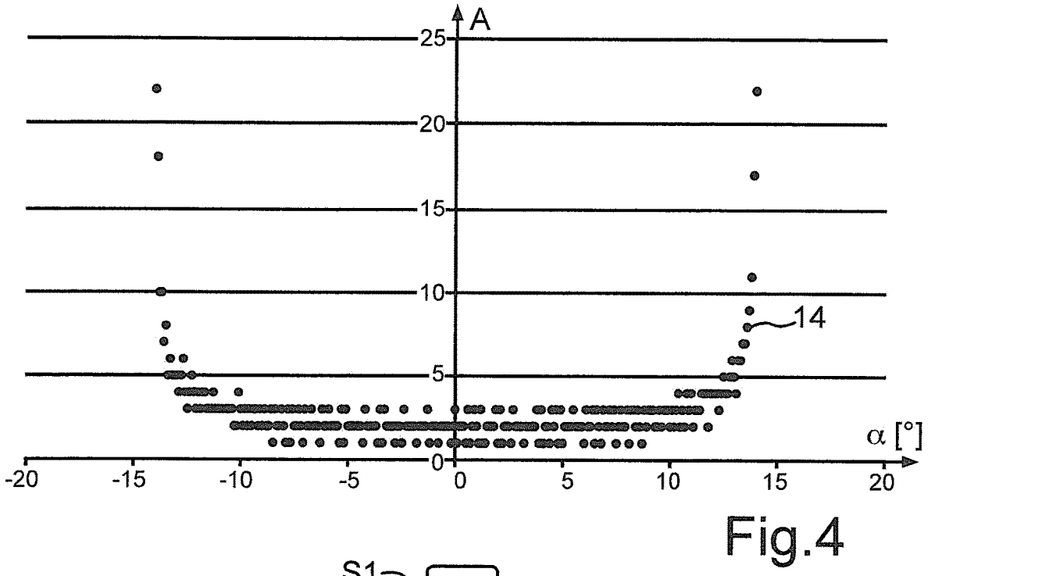
FIG. 4 shows a frequency distribution of the emission points in time according to FIG. 3 in dependence on an angle of a deflection unit of the optoelectronic sensor.

FIG. 4 shows a frequency distribution of the emission points in time 14 according to FIG. 3. In this case, the deflection angle α is plotted on the abscissa and the number A of the emission points in time 14 is plotted on the ordinate. It can be seen in this case that multiple light sources are unnecessarily emitted at the peripheral regions and/or at the reversal points of the oscillating mirror element, which are in the region of −14° and +14°. In the present case, up to 23 light pulses are emitted in the region of −14° and in the region of +14°. This has the result, for example, that angle positions in the angle range 12 which are associated with these deflection angles α are illuminated at a higher intensity. This can be critical in particular with respect to the ocular safety.

Figure 5:
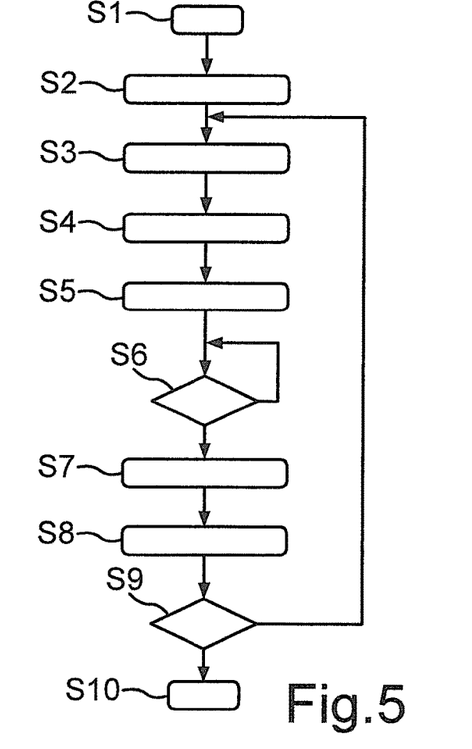
FIG. 5 shows a schematic flow chart of a method for operating the optoelectronic sensor.

FIG. 5 shows a schematic flow chart of a method for operating an optoelectronic sensor 5 according to one embodiment of the present invention. The method is started in a step S1. A measuring cycle which is carried out using the optoelectronic sensor 5 is thus also started. In a step S2, the discrete angle positions within the angle range 12 are determined which are to be scanned and/or in which the light pulses are to be emitted. An emission deflection angle is then associated with each of the discrete angle positions. The emission deflection angle describes the deflection angle α of the mirror element at which a light pulse is to be emitted. A corresponding emission deflection angle is thus determined for each of the discrete angle positions. Furthermore, an array can be determined in which a first value is entered for each of the determined emission deflection angles. The first value can be, for example, the value zero or also the value "false".

In a step S3, the present deflection angle α of the mirror element is determined. A corresponding signal can be received here from the deflection unit 13. The present deflection angle α can also be determined on the basis of an activation signal, using which the actuator of the deflection unit 13 is activated. In a step S4, that emission deflection angle is determined which is closest to the present deflection angle α. In this case, the closest deflection angle is determined on the basis of the array. In a step S5, a waiting time td is determined, after the passage of which the mirror element will reach the closest emission deflection angle. In a step S6, a loop is run through until the waiting time td has passed.

If the waiting time td has passed, the light source 12 is activated to emit the light pulse. Moreover, the light pulse reflected from the object 3 is received and the distance between the optoelectronic sensor 5 and the object 3 is determined on the basis of the time of flight. In a step S8, a second value is associated with the emission deflection angle, at which the light pulse was emitted, in the array. The second value can be, for example, the value one or "true". In a step S9, it is then checked whether a light pulse was emitted for all determined deflection angles α. If this is not the case, the method is continued further in step S3. If this is the case, the method is ended in a step S10.

Figure 6:
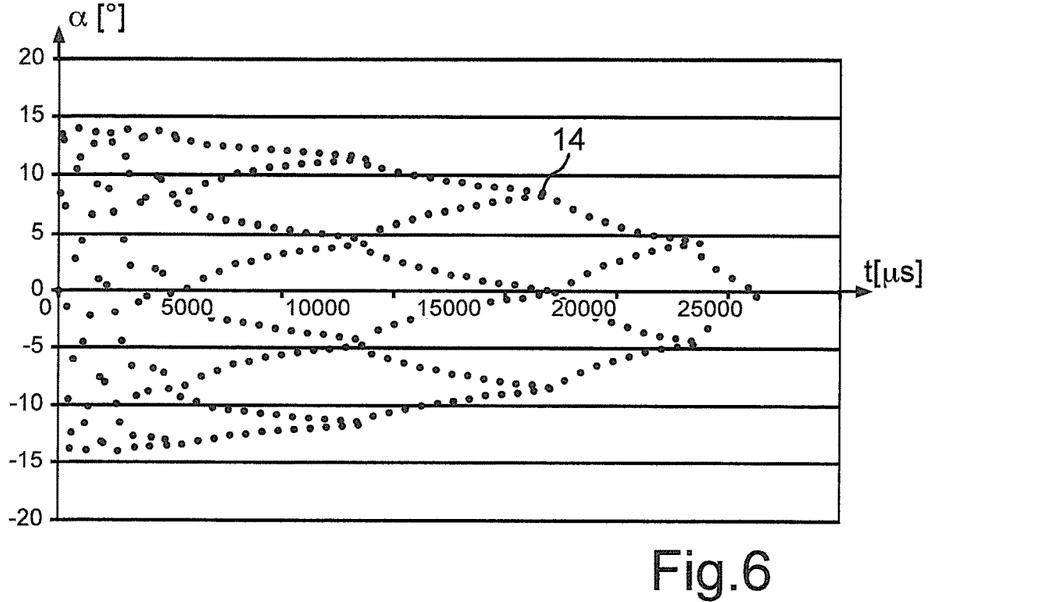
FIG. 6 shows a chronological sequence of emission points in time at which light pulses are emitted using the emitting unit according to one embodiment of the invention.

FIG. 6 shows the chronological sequence of the emission points in time 14, at which the light pulses are emitted using the emitting unit 6 of the optoelectronic sensor 5. In this case, the optoelectronic sensor 5 is operated according to a method according to the invention. It can be seen in this case that the time intervals between the emission points in time 14 differ. The light source 12 is thus not activated periodically. It is moreover provided in this case that only one light pulse is emitted at each of the emission deflection angles. Furthermore, it can be seen that the measuring cycle can be carried out within a chronological duration of approximately 12.5 ms. It is taken into consideration in this case that a pause of 29.4 ms is maintained between the emission of two successive light pulses. This corresponds to the frequency of 34 kHz according to the example of FIG. 3. It is clear here that in comparison to routine operation of the optoelectronic sensor 5, which is shown in FIG. 3, the time of a measuring cycle can be almost halved.

Figure 7:
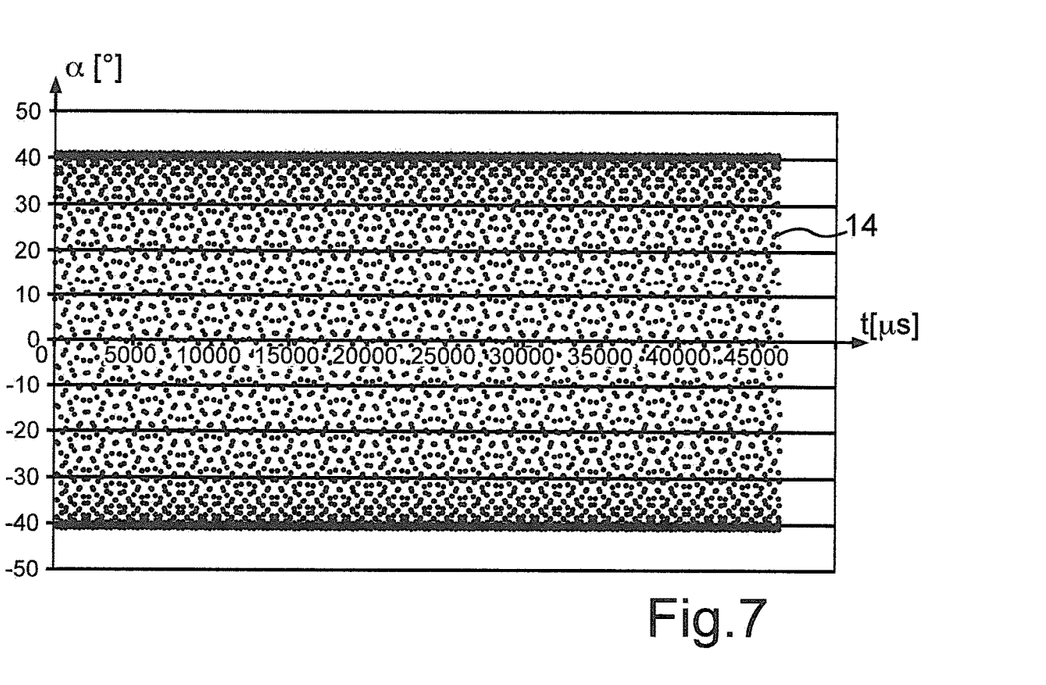
FIG. 7 shows a chronological sequence of emission points in time at which light pulses are emitted using the emitting unit according to a further embodiment.
Figure 8:
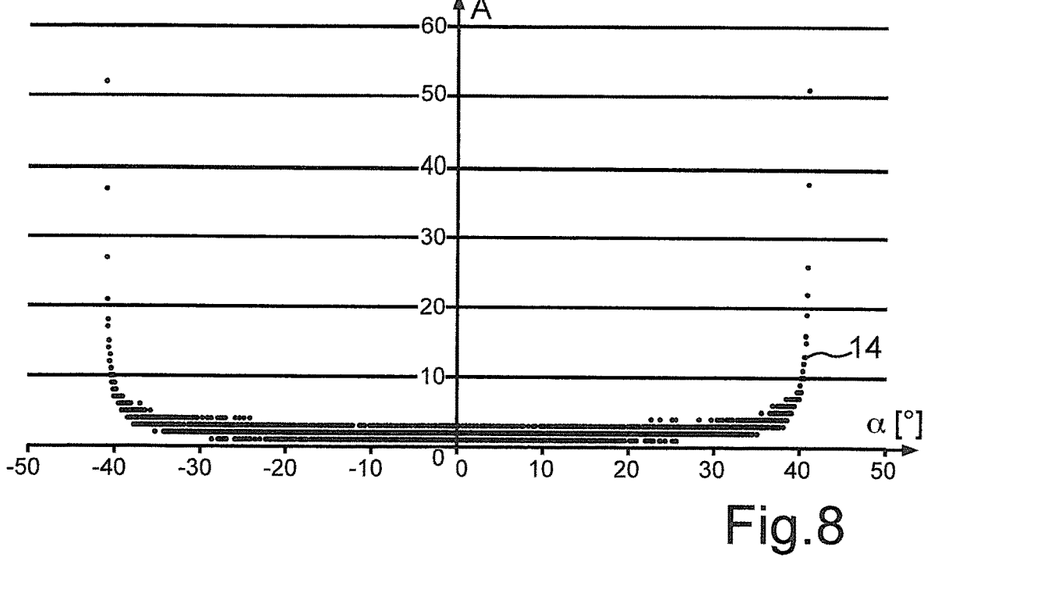
FIG. 8 shows a frequency distribution of the emission points in time according to FIG. 7 in dependence on the angle of the deflection unit of the optoelectronic sensor.

FIG. 7 shows a further chronological sequence of emission points in time 14, at which the light pulses are periodically emitted according to a method from the prior art. In this example, the light pulses are emitted at a frequency of 100 kHz. For this purpose, the mirror element oscillates at a frequency of 3.485 kHz. In this case, the mirror element is deflected between a deflection angle α of −41° and a deflection angle α of +41°. In this case, it takes approximately 46.5 ms until all angle positions have been measured at least once. FIG. 8 shows the associated frequency distribution. It can be seen here that the angle positions are unnecessarily measured multiple times at the peripheral regions and/or at the reversal points at −41° and +41°. In this case, up to 52 light pulses are emitted at these deflection angles and/or at the reversal points.

Figure 9:
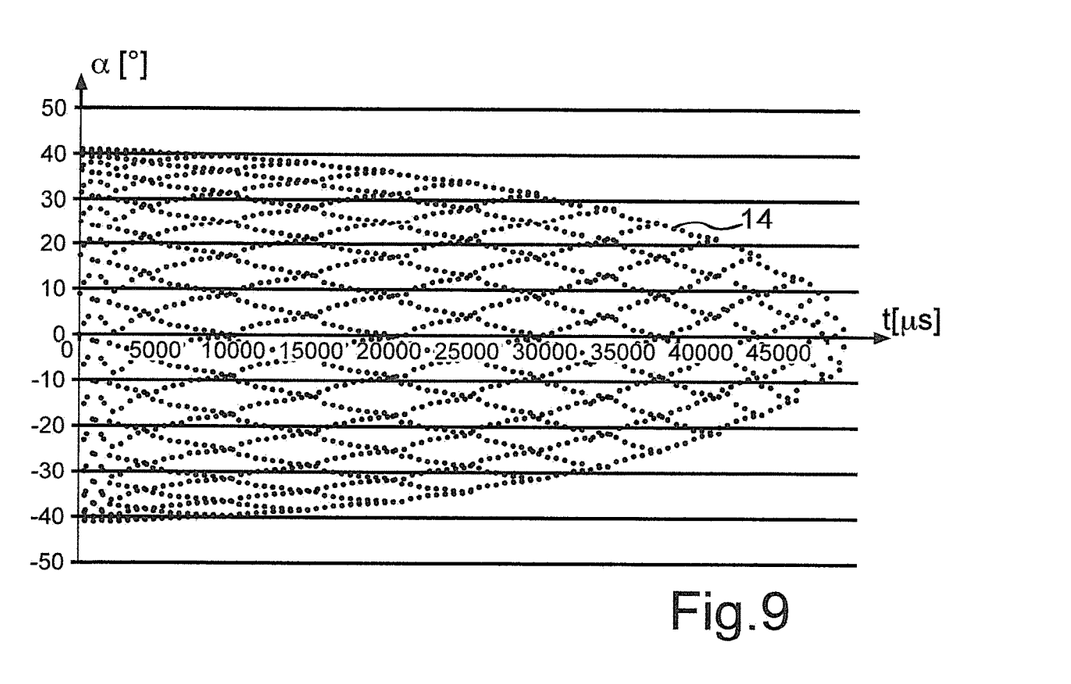
FIG. 9 shows a chronological sequence of emission points in time at which light pulses are emitted using the emitting unit according to a further embodiment of the invention.
Figure 10:
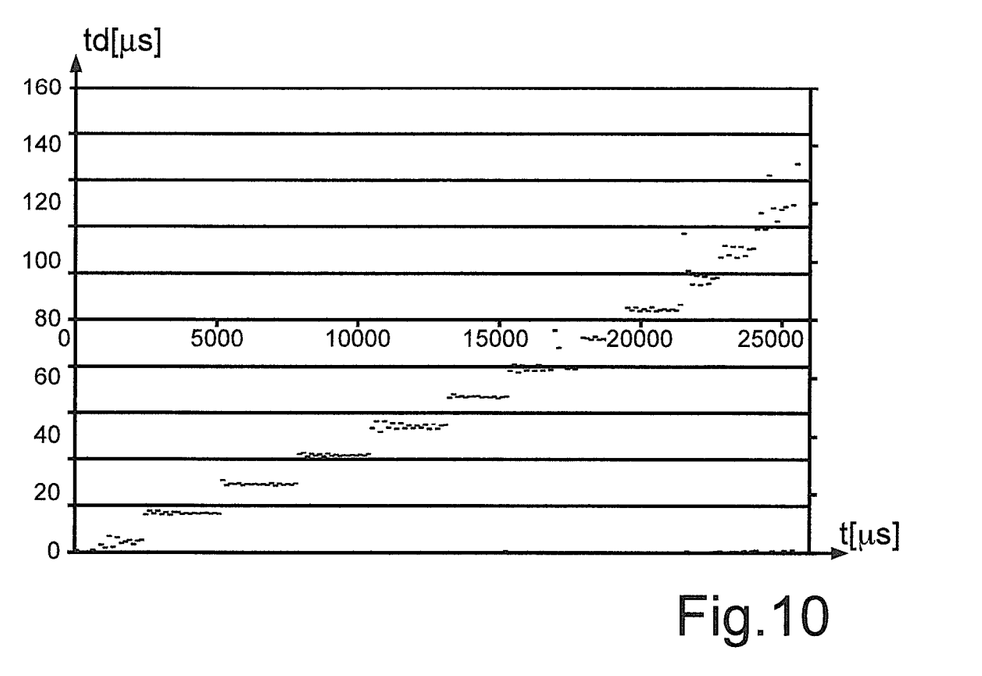
FIG. 10 shows a chronological sequence of waiting times between the respective emission points in time according to FIG. 9.

In comparison thereto, FIG. 9 shows the chronological sequence of the emission points in time 14, wherein the optoelectronic sensor 5 is operated according to a method according to the invention. It is also taken into consideration here that a chronological duration of approximately 10 μs is maintained between the emission of two successive light pulses. This corresponds to the frequency of 100 kHz according to the example of FIG. 7. It can be seen here that the measuring cycle can be carried out within a chronological duration of 25.5 ms. FIG. 10 shows the respective waiting times td which have to be waited out until the mirror element has reached the closest emission deflection angle. It can be seen in this case that the waiting time td increases during the measuring cycle. Overall, however, the measuring cycle can be carried out significantly more rapidly than the known method.

The invention claimed is:

1. A method for operating an optoelectronic sensor of a motor vehicle, the method comprising:
   during a measuring cycle for detecting an object, emitting light pulses using an emitting unit;
   receiving the light pulses reflected from the object using a receiving unit;
   activating a light source of the emitting unit at determined emission points in time to emit the light pulses; and
   deflecting the light pulses, using a deflection unit of the emitting unit, within a predetermined angle range,
   wherein the light source is activated in such a way that time intervals between the determined emission points in time differ from one another,
   wherein the deflection unit has a mirror element, which is periodically deflected to deflect a light pulse,
   wherein a deflection angle of the mirror element is determined and the light source is activated in dependence on the determined deflection angle,
   wherein a plurality of angle positions for the emission of the light pulses is determined within the angle range, an emission deflection angle is determined for each of the angle positions, and the respective light pulse is emitted if the deflection angle of the mirror element corresponds to one of the emission deflection angles,
   wherein on the basis of the present deflection angle of the mirror element, an emission deflection angle closest to the present deflection angle is determined and the light pulse is emitted if the present deflection angle corresponds to the closest emission deflection angle,
   wherein a waiting time is determined on the basis of the present deflection angle and the closest emission deflection angle, after the passage of which the mirror element will reach the closest emission deflection angle, and the light pulse will be emitted after the passage of the waiting time, and
   wherein the mirror element is an oscillating mirror element.

2. The method according to claim 1, wherein the respective light pulses are only emitted once at each of the emission deflection angles during the measuring cycle.

3. The method according to claim 1, further comprising: for each of the emission deflection angles, recording a first value to represent that no light pulse has been emitted at the corresponding emission deflection angle at the beginning of the measuring cycle, and changing the first value to a second value after a light pulse has been emitted at the corresponding emission deflection angle.

4. The method according to claim 1, wherein an emission point in time is determined for each of the emission deflection angles and the light source is activated at each of the determined emission points in time.

5. The method according to claim 1, wherein the activation of the light source is synchronized with the movement of the mirror element.

6. The method according to claim 1, wherein a distance between the optoelectronic sensor and the object is determined after the emission of the light pulse on the basis of the time of flight between the emission of the light pulse and the reception of the light pulse reflected from the object and the next light pulse is subsequently emitted.

7. An optoelectronic sensor for a motor vehicle, the optoelectronic sensor being configured to:
during a measuring cycle for detecting an object, emit light pulses using an emitting unit;
receive the light pulses reflected from the object using a receiving unit;
activate a light source of the emitting unit at determined emission points in time to emit the light pulses; and
deflect the light pulses, using a deflection unit of the emitting unit, within a predetermined angle range,
wherein the light source is activated in such a way that time intervals between the determined emission points in time differ from one another,
wherein the deflection unit has a mirror element, which is periodically deflected to deflect a light pulse,
wherein a deflection angle of the mirror element is determined and the light source is activated in dependence on the determined deflection angle,
wherein a plurality of angle positions for the emission of the light pulses is determined within the angle range, an emission deflection angle is determined for each of the angle positions, and the respective light pulse is emitted if the deflection angle of the mirror element corresponds to one of the emission deflection angles,
wherein on the basis of the present deflection angle of the mirror element, an emission deflection angle closest to the present deflection angle is determined and the light pulse is emitted when the present deflection angle corresponds to the closest emission deflection angle,
wherein a waiting time is determined on the basis of the present deflection angle and the closest emission deflection angle, after the passage of which the mirror element will reach the closest emission deflection angle, and the light pulse will be emitted after the passage of the waiting time, and
wherein the mirror element is an oscillating mirror element.

8. The optoelectronic sensor according to claim 7, wherein the optoelectronic sensor is a lidar sensor or as a laser scanner.

9. A driver assistance system for a motor vehicle having an optoelectronic according to claim 7.

10. A motor vehicle having a driver assistance system according to claim 9.

* * * * *